United States Patent
Hessling-Von Heimendahl et al.

(10) Patent No.: US 10,343,793 B2
(45) Date of Patent: Jul. 9, 2019

(54) SILICONE ENCAPSULATED AIRCRAFT LED LIGHT

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/425,065

(22) Filed: Feb. 6, 2017

(65) Prior Publication Data

US 2017/0233101 A1 Aug. 17, 2017

(30) Foreign Application Priority Data

Feb. 12, 2016 (DE) .................. 10 2016 102 471

(51) Int. Cl.
| | |
|---|---|
| *F21S 41/141* | (2018.01) |
| *F21S 41/37* | (2018.01) |
| *B64D 47/06* | (2006.01) |
| *B64D 47/04* | (2006.01) |
| *F21V 5/04* | (2006.01) |
| *F21V 7/00* | (2006.01) |
| *F21V 19/00* | (2006.01) |
| *H05B 37/03* | (2006.01) |
| *F21Y 115/10* | (2016.01) |

(52) U.S. Cl.
CPC ............ *B64D 47/06* (2013.01); *B64D 47/04* (2013.01); *F21V 5/04* (2013.01); *F21V 7/0091* (2013.01); *F21V 19/002* (2013.01); *H05B 37/03* (2013.01); *B64D 2203/00* (2013.01); *F21Y 2115/10* (2016.08)

(58) Field of Classification Search
CPC . F21W 2107/30; F21W 2103/00; F21S 41/10; F21S 41/141; F21S 41/37; F21S 43/14
See application file for complete search history.

(56) References Cited

U.S. PATENT DOCUMENTS

| | | | | |
|---|---|---|---|---|
| 5,559,681 | A * | 9/1996 | Duarte ................. | F21V 21/08 362/231 |
| 6,113,248 | A * | 9/2000 | Mistopoulos ........... | F21V 23/06 362/219 |
| 6,866,398 | B2 * | 3/2005 | Lin ......................... | F21S 4/26 362/244 |
| 6,871,981 | B2 * | 3/2005 | Alexanderson ....... | F21V 29/004 362/294 |

(Continued)

*Primary Examiner* — Ismael Negron
(74) *Attorney, Agent, or Firm* — Cantor Colburn LLP

(57) ABSTRACT

An exterior aircraft light includes a mounting board, having an upper side, a lower side and a plurality of side faces; at least one LED, arranged on the upper side of the mounting board; and a mounting board enclosure and lens structure, wherein the mounting board enclosure and lens structure comprises a lens arranged over the at least one LED for shaping an output light intensity distribution of the exterior aircraft light and a covering layer arranged on the upper side, the lower side and the plurality of side faces of the mounting board, wherein the mounting board enclosure and lens structure is an integral silicone structure.

15 Claims, 3 Drawing Sheets

(56) References Cited

U.S. PATENT DOCUMENTS

| | | | |
|---|---|---|---|
| 7,018,079 B1* | 3/2006 | Franco-Vila | A62B 1/20 |
| | | | 362/253 |
| 7,665,861 B2* | 2/2010 | Blumel | F21K 9/00 |
| | | | 362/248 |
| 8,230,575 B2* | 7/2012 | Veenstra | B60Q 1/2696 |
| | | | 174/377 |
| 8,283,693 B2 | 10/2012 | Lee et al. | |
| 8,697,458 B2 | 4/2014 | Nolan et al. | |
| 8,721,116 B2 | 5/2014 | Nearman | |
| 8,835,953 B2 | 9/2014 | Liu et al. | |
| 8,933,473 B1 | 1/2015 | Dubin | |
| 9,012,947 B2 | 4/2015 | Park | |
| 9,103,514 B2* | 8/2015 | Pitkanen | F21S 4/006 |
| 9,175,840 B2* | 11/2015 | Patti | F21V 27/02 |
| 9,464,780 B2* | 10/2016 | Huang | F21V 5/04 |
| 2004/0223328 A1* | 11/2004 | Lee | B60Q 1/2607 |
| | | | 362/249.01 |
| 2009/0045424 A1 | 2/2009 | Liskoff | |
| 2011/0031516 A1* | 2/2011 | Basin | H01L 33/507 |
| | | | 257/98 |
| 2013/0161658 A1* | 6/2013 | Lin | H01L 33/52 |
| | | | 257/88 |
| 2013/0313604 A1 | 11/2013 | Engl et al. | |
| 2014/0374786 A1 | 12/2014 | Bierhuizen | |
| 2015/0077985 A1 | 3/2015 | Wang et al. | |

\* cited by examiner

SILICONE ENCAPSULATED AIRCRAFT LED LIGHT

FOREIGN PRIORITY

This application claims priority to German Patent Application No. 102016102471.6 filed Feb. 12, 2016, the entire contents of which is incorporated herein by reference.

TECHNICAL FIELD

The present invention relates to exterior aircraft lighting. In particular, it relates to exterior aircraft lights that employ one or more LEDs as light sources, which are mounted to a mounting board, such as a printed circuit board (PCB).

BACKGROUND

Almost all aircraft are equipped with exterior lights. In particular, large passenger air planes are provided with a wide variety of exterior lights. The exterior lights are provided for various different purposes, such as for allowing the passengers and/or air crew to view the outside, for passive visibility, for signaling purposes, etc. Examples of such exterior lights are navigation lights, also referred to as position lights, anti-collision lights, landing lights, taxi lights, runway turn-off lights, etc.

LEDs are a potential kind of light source for exterior aircraft lights. They are commonly mounted on a mounting board that is adapted for the arrangement and connection of electronic components. Such mounting board may be a printed circuit board (PCB). There is a number of issues around the use of such printed circuit boards. For example, electric connectors of the PCB and, potentially, other electronic components may be subject to undesired electrostatic discharge (ESD). As another example, excessive heat may be built up at the printed circuit board during operation. The foregoing issues are particularly severe in exterior aircraft lights, as they are required to operate in very hazardous conditions. Depending on their location on the aircraft, they may have to withstand large aerodynamic forces, strong vibrations, large temperature variations and/or hazardous gases, such as exhaust fumes. Addressing these issues has lead to complicated designs for exterior aircraft lights in the past, resulting in complicated and lengthy production procedures.

Accordingly, it would be beneficial to provide an exterior aircraft light that provides for improved implementations of exterior aircraft lights with PCB-mounted LEDs. Further, it would be beneficial to provide an aircraft with such an improved exterior aircraft light.

SUMMARY

Exemplary embodiments of the invention include an exterior aircraft light, comprising a mounting board, having an upper side, a lower side and a plurality of side faces; at least one LED, arranged on the upper side of the mounting board; and a mounting board enclosure and lens structure, wherein the mounting board enclosure and lens structure comprises a lens arranged over the at least one LED for shaping an output light intensity distribution of the exterior aircraft light and a covering layer arranged on the upper side, the lower side and the plurality of side faces of the mounting board, wherein the mounting board enclosure and lens structure is an integral silicone structure.

Exemplary embodiments of the invention allow for the integration of the conditioning of the output light intensity distribution, the electrostatic discharge (ESD) protection, and the heat transport away from the mounting board into a single structure. In particular, the lens is formed in the mounting board enclosure and lens structure, which is an integral silicone structure, such that a desired output light intensity distribution can be achieved with a structure that simultaneously serves further purposes. The part of the covering layer arranged on the upper side of the mounting board is an effective means of preventing electrostatic discharge from the electric connectors of the mounting board and, potentially, other electronic components. Yet further, the part of the covering layer arranged on the lower side of the mounting board provides for an effective means of conducting heat, which is generated during the operation of the at least one LED and, potentially, other electronic components, away from the mounting board.

By providing the mounting board enclosure and lens structure as an integral silicone structure, this integral silicone structure can be applied to the mounting board as a single element in a single step of the manufacturing process. In this way, multiple issues of LED-based exterior aircraft lights can be addressed in a single manufacturing step, eliminating the need for separate manufacturing steps and reducing the number components required for making the mounting board and the associated at least one LED ready to use in an exterior aircraft light. For example, electrostatic discharge catching elements and/or potting for wiring and/or thermal pads for heat conduction, as used in prior art approaches, may be eliminated due to the provision of the mounting board enclosure and lens structure.

The integral silicone structure is from a transparent silicone, thus providing a lens of high optical efficiency and thus helping in providing high light intensities, as required in various exterior aircraft lighting applications. Silicone is as suitable material for the mounting board enclosure and lens structure for the additional reasons that it is easily moldable and conveniently applicable to the mounting board due to its elasticity.

The integral silicone structure is a contiguous element that reaches around the mounting board and covers all sides thereof. In particular, there are no distinct elements covering the opposite upper and lower sides of the mounting board. The mounting enclosure and lens structure reaches around the side faces of the mounting board for forming a single-piece integral silicone structure.

An exemplary kind of silicone may be a so-called liquid silicone rubber. A particular example of an exemplary kind of silicone is Dow Coming ® MS-0002 Moldable Silicone.

The terms upper side, lower side and side faces of the mounting board are used in order to express the relative relationship between those elements, such as the upper side and lower side being opposite sides of the mounting board. It is pointed out that these terms do not characterize the orientation of the exterior aircraft light in use, when assembled to the aircraft. Rather, the upper side of the mounting board is defined as the side carrying the at least one LED and, potentially, other electronic components. In case the mounting board is a generally quadratic or rectangular structure, it has four side faces. However it also possible that the mounting board has a smaller or larger number of side faces, depending on the general geometric shape thereof. The upper side and the lower side are generally the sides of greatest extension of the mounting board.

The mounting board may be a printed circuit board or other suitable kind of mounting board that is adequate for carrying the at least one LED, and, potentially, other circuit elements/components. A printed circuit board is a convenient way of providing electric connections to/from the at least one LED, such as to/from a power supply, a control unit, etc.

According to a further embodiment, the mounting board enclosure and lens structure fully encloses the mounting board and the at least one LED. By providing the mounting board enclosure and lens structure as fully enclosing the mounting board and the at least one LED, the mounting board enclosure and lens structure has no edges where covered portions of the mounting board are adjacent to uncovered portions of the mounting board. By avoiding such edges between covered and uncovered portions, the danger of the mounting board enclosure and lens structure peeling off the mounting board is greatly reduced. The term of the mounting board enclosure and lens structure fully enclosing the mounting board and the at least one LED refers to the mounting board enclosure and lens structure covering at least all parts of the mounting board and the at least one LED that would otherwise be uncovered from other mechanical structures. The enclosing of such parts of the mounting board, which are covered by other elements regardless, is optional. For example, holes through the mounting board that are eventually used for passing through screws for attaching the mounting board to a housing or similar structure may remain free of the integral silicone structure. This is because these areas, due to being covered by the screws in the finished product, do not give rise to open edges of the mounting board enclosure and lens structure and therefore do not pose a substantial danger of giving rise to the integral silicone structure peeling off the mounting board.

According to a further embodiment, the mounting board enclosure and lens structure is overmolded over the mounting board and the at least one LED. In this way, the mounting board enclosure and lens structure may be shaped into the desired shape and attached to the mounting board in a single molding operation, thus allowing for efficient production thereof.

The exterior aircraft light may have further circuit components, such as a near end off light detector for the at least one LED, a control unit for the at least one LED, a power supply circuit for the at least one LED, etc. Further, the mounting board may be provided with electric conductors, such as wires, for connecting the at least one LED to these further circuit elements and/or for connecting these further circuit elements to each other. The mounting board enclosure and lens structure may be overmolded over these further circuit elements as well, thus electrically isolating the components from each other and preventing electrostatic discharge.

According to a further embodiment, the mounting board enclosure and lens structure is from a soft silicone. In particular, the mounting board enclosure and lens structure is from a silicone with a Shore hardness of between 10A and 80A.

According to a further embodiment, the exterior aircraft light further comprises a gas impermeable coating, coated over the mounting board enclosure and lens structure. In this way, corrosive substances, such as aircraft exhaust gases and water vapour, can be kept away from the mounting board enclosure and lens structure, thus allowing for a longer life time of the exterior aircraft light. Moreover, the gas impermeable coating may also form a corset or sandwich structure, together with the mounting board, for the mounting board enclosure and lens structure, thus increasing the stability thereof. Such a corset may ensure that the mounting board enclosure and lens structure stays in place, in particular in highly demanding situations, such as in high acceleration and high vibration scenarios during take-off or landing of the aircraft. High accelerations may in particular be present in the exterior aircraft lights in the wing tips of an aircraft. Such a corset may be particularly beneficial in the case of the mounting board enclosure and lens structure being made from a soft silicone. The mounting board and the gas impermeable coating may be much harder than the soft silicone, in particular more than 10 times as hard.

According to a further embodiment, the gas impermeable coating is a parylene coating. Parylene is particularly suitable as gas impermeable coating, because it is highly resistant to corrosive gases and it has large inherent stability for providing a shell/corset for the mounting board enclosure and lens structure. Parylene may act as a gas, moisture and dielectric barrier. Chemically, parylene is a vapour deposition of poly-xylylene. Exemplary kinds of parylene are Parylene N, SF, HT, AF-4, etc.

According to a further embodiment, the covering layer has a top portion, arranged on the upper side of the mounting board, wherein the top portion has a thickness of between 0.25 mm and 2.5 mm. In a particular embodiment, the top portion may have a thickness of between 1 mm and 2 mm. Such a thickness of the covering layer on the upper side of the mounting board is particularly effective in preventing electrostatic discharge on the upper side of the mounting board.

According to a further embodiment, the covering layer has a bottom portion arranged on the lower side of the mounting board, wherein the bottom portion has a thickness of between 0.5 mm and 4 mm, in particular of between 1 mm and 3 mm. In this way, the bottom portion of the covering layer is particularly suitable for providing good thermal conduction and for having sufficient thickness for evening out the lower side of the mounting board. Due to the latter effect, the mounting board can be attached to a supporting structure, such as to an exterior aircraft light housing, without substantial air enclosures between the bottom portion of the covering layer and the supporting structure. The bottom portion may effectively assume the functionality that was previously effected by a thermal pad/thermal grease underneath the mounting board, which may therefore be eliminated.

Exemplary embodiments of the invention further include an exterior aircraft light, comprising a mounting board, having an upper side, a lower side and a plurality of side faces; at least one LED, arranged on the upper side of the mounting board; and a mounting board enclosure and lens structure, wherein the mounting board enclosure and lens structure comprises a lens arranged over the at least one LED for shaping an output light intensity distribution of the exterior aircraft light and a covering layer arranged on the upper side, the lower side and the plurality of side faces of the mounting board, wherein the lens and a first portion of the covering layer are from silicone and wherein a second portion of the covering layer is from a filler material.

Embodiments with the lens and the first portion of the covering layer being from silicone and the second portion of the covering layer being from a filler material are an alternative to above described embodiments with the entire mounting board enclosure and lens structure, i.e. with both the lens and the entire covering layer, being an integral silicone structure. Beneficial effects, such as electrostatic discharge protection, thermal conductivity, and high integration and manufacturing efficiency, may also be achieved in this alternative manner.

The first portion of the covering layer and the second portion of the covering layer may have the same thickness or may different thicknesses. In other words, it is possible that the transition from the first portion to the second portion of the covering layer is flush or that a noticeable change in geometry is present at the transition. The filler material is referred to as filler material, because it fills the gaps in the silicone part of the mounting board enclosure and lens structure.

According to a further embodiment, the first portion of the covering layer is arranged on the upper side, the plurality of side faces, and part of the lower side of the mounting board. The second portion of the covering layer may be arranged on another part of the lower side of the mounting board. In this way, silicone may be saved on the lower side of the mounting board, where a smaller amount of silicone may be sufficient for providing a desired thermal conductivity.

According to a further embodiment, the mounting board enclosure and lens structure fully encloses the mounting board and the at least one LED. In other words, either the lens or the first portion of the covering layer or the second portion of the covering layer is present at every part of the mounting board and its associated electronic components, including the at least one LED. In yet other words, either the silicone part or the filler material part of the mounting board enclosure and lens structure is present at every part of the mounting board and its associated electronic components. Again, the danger of the mounting board enclosure and lens structure, in particular of the silicone part thereof, peeling off the mounting board is kept low in this way.

According to a further embodiment, the filler material is parylene. The filler material may also be any other material that is suitable for covering a part of the mounting board in between the gaps of the silicone of the first portion of the covering layer.

According to a further embodiment, the exterior aircraft light further comprises a gas impermeable coating, coated over the lens and the first portion of the covering layer. In particular, the gas impermeable coating may be a parylene coating. Reference is made to above discussion of the gas impermeable coating, which analogously applies here.

According to a further embodiment, the exterior aircraft light is one of a navigation light, an anti-collision light, a landing light, a runway turnoff light, a taxi light, and a logo light. The navigation light may be a forward navigation light, such as a forward navigation light arranged in a wing tip, or a tail navigation light. Also, the anti-collision light may be a wing tip anti-collision light or a tail anti-collision light. In the case of the exterior aircraft light being a tail navigation light or a tail anti-collision light, the gas impermeable coating is particularly helpful in protecting the mounting board enclosure and lens structure from exhaust gases from an auxiliary power unit (APU).

Exemplary embodiments of the invention further include an aircraft, comprising at least one exterior aircraft light, as described in any of the embodiments above, arranged on an outside of the aircraft. The modification, additional features, and effects discussed above with respect to the embodiments of the exterior aircraft light equally apply to the aircraft as a whole. The aircraft may for example by an air plane or a helicopter.

BRIEF DESCRIPTION OF THE DRAWINGS

Further exemplary embodiments of the invention are described in detail below with respect to the accompanying drawings, wherein.

DETAILED DESCRIPTION

Figure 1:
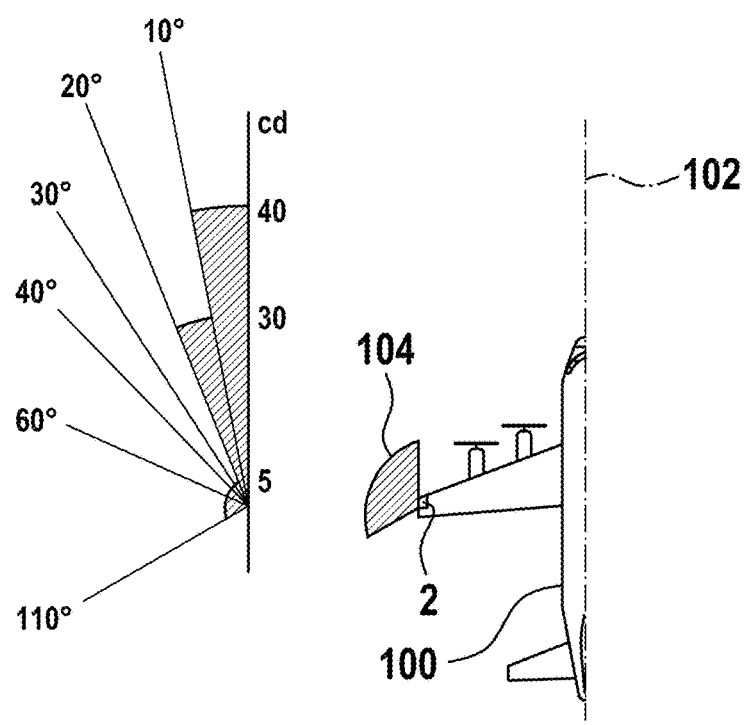
FIG. 1 shows an aircraft in accordance with an exemplary embodiment of the invention, having a forward navigation light in accordance with an exemplary embodiment of the invention installed thereon.

FIG. 1 shows an aircraft 100 in accordance with an exemplary embodiment of the invention. The aircraft 100 is equipped with a forward navigation light 2, positioned in a left wing tip of the aircraft 100. The forward navigation light 2 is an exterior aircraft light in accordance with an exemplary embodiment of the invention. Only half of the aircraft 100 is depicted in FIG. 1. It is understood that the aircraft 100 is substantially symmetric with respect to its axis of longitudinal extension 102. Hence, a symmetric forward navigation light in accordance with an exemplary embodiment of the invention is provided in the right wing tip as well. The axis of longitudinal extension 102 is also the forward flight direction of the aircraft 100, when air borne.

The forward navigation light 2 has an output light emission distribution 104 over an angular region of 110° in a horizontal cross-sectional plane through the forward navigation light 2. The output light emission distribution 104 extends over an angular region from straight ahead, i.e. from the forward flight direction, to an angle of 110° counter-clockwise. In the left portion of FIG. 1, it is illustrated that the output light emission distribution has three distinct output regions, namely a peak light intensity region between the forward flight direction of the aircraft and an angle of 10° therewith, a medium light intensity region between 10° and 20°, and a low light intensity region between 20° and 110°. The output light intensity is 40 cd in the peak light intensity region, 30 cd in the medium light intensity region, and 5 cd in the low light intensity region. In this way, the forward navigation light 2 is in compliance with Federal Aviation Regulation (FAR) requirements for forward navigation lights.

Figure 2:
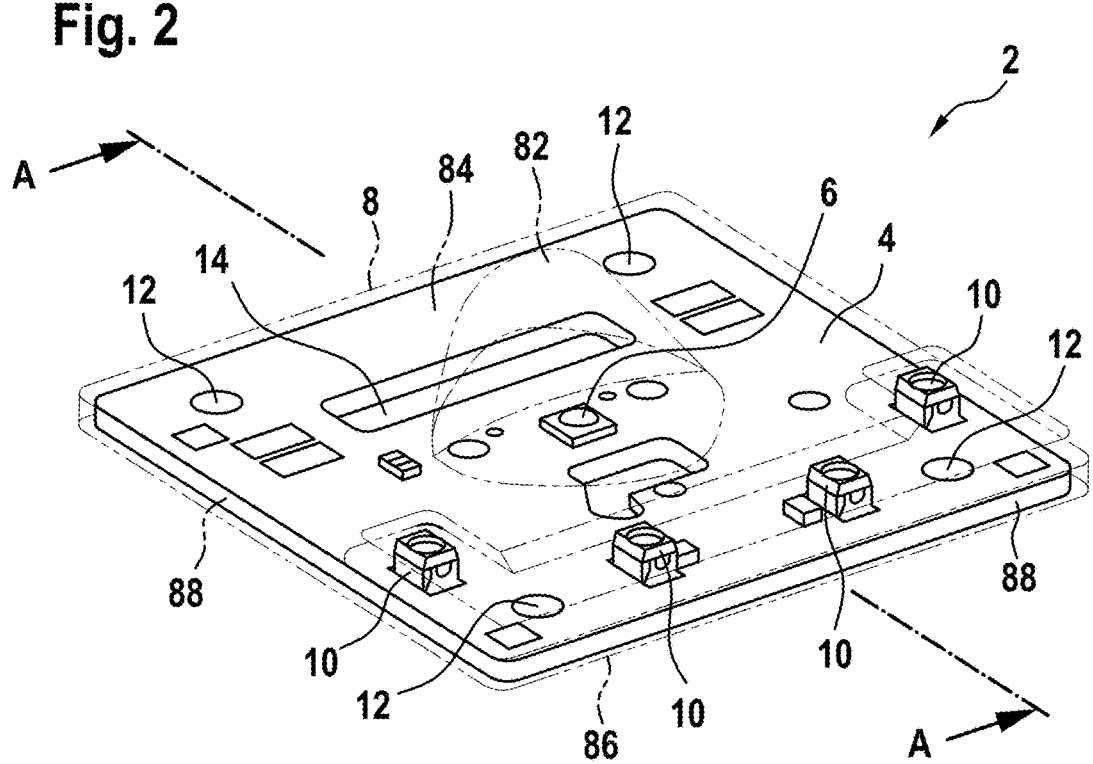
FIG. 2 shows a perspective view of an exterior aircraft light in accordance with an exemplary embodiment of the invention.

FIG. 2 shows an exterior aircraft light 2 in accordance with an exemplary embodiment of the invention in a perspective view. The exterior aircraft light 2 may be used as the forward navigation light 2 of the aircraft 100, depicted in FIG. 1.

The exterior aircraft light 2 comprises a mounting board 4 and an LED 6. The LED 6 is arranged substantially at the center of the mounting board 4. The mounting board 4 is a printed circuit board (PCB). The exterior aircraft light 2 further comprises four additional circuit components 10. In the exemplary embodiment of FIG. 4, the four additional circuit components 10 are a power supply circuit for controlling the drive current to the LED 6, a sensor for measuring relative luminous flux, and two indicator LEDs for indicating near end of life to service personnel. It is also possible that other circuit components, such as a control circuit and power storage circuits, for example capacitor circuits, are present. These additional circuit components 10 are provided for receiving power from a power supply, temporarily storing power and for supplying power to the LED 6 and for controlling the LED 6. Electric connectors are provided on the mounting board 4 that interconnect the LED 6 and the additional circuit components 10. When used as the forward navigation light 2 of the aircraft 100 of FIG. 1, the mounting board 4 my be arranged vertically, with the main light emission direction of the LED 6, i.e. the direction perpendicular to the mounting board 4 through the LED 6, being angled with respect to the forward flight direction of the aircraft 100.

The exterior aircraft light 2 further comprises a mounting board enclosure and lens structure 8. The mounting board enclosure and lens structure 8 is a one-piece silicone structure, also referred to as an integral silicone structure. The mounting board enclosure and lens structure 8 both encloses the mounting board with a silicone layer and forms a lens out of silicone arranged over the LED 6. In particular, the mounting board enclosure and lens structure 8 is comprised of a lens 82, arranged over the LED 6, and a covering layer, which in turn is comprised of a top portion 84, a bottom portion 86, and side portions 88. The top portion 84 of the covering layer is arranged on the upper side of the mounting board 4, i.e. on the side of the mounting board 4 that supports the LED 6. The bottom portion 86 of the covering layer is arranged on the lower side of the mounting board 4, i.e. on the side of the mounting board 4 that is opposite the LED 6. The side portions 88 of the covering layer are arranged on the side faces of the mounting board 4. As the mounting board 4 is a plate-like, generally quadratic structure, the side faces are much smaller in extension than the upper and lower sides of the mounting board 4.

In the exemplary embodiment of FIG. 2, the mounting board enclosure and lens structure 8 fully encloses the mounting board 4 and the LED 6. In other words, the mounting board enclosure and lens structure 8 fully surrounds the mounting board 4 and the LED 6, i.e. it covers the entire upper and lower sides as well as the side faces of the mounting board 4. The mounting board enclosure and lens structure 8 also encloses the four additional circuit components 10. The mounting board 4 and the LED 6 are completely encased by the mounting board enclosure and lens structure 8.

It is pointed out that a plurality of LEDs may be provided instead of the single LED 6 of the exemplary embodiment. For example, a one-dimensional or two-dimensional array of LEDs may be provided. The number and arrangement of LEDs may depend on the light intensity requirements of the particular application.

The mounting board 4 further comprises four through holes 12. In the production state depicted in FIG. 2, the four through holes 12 are also covered by the mounting board enclosure and lens structure 8. However, during assembly of the mounting board 4 to a housing of the exterior aircraft light or to the aircraft body, screws or bolts may be introduced through the through holes 12 for fastening the mounting plate 4. It is also possible that the through holes 12 are left free of silicone from the mounting board enclosure and lens structure 8. In such a case, the mounting board 4 and the LED 6 would still be considered fully enclosed, because the through holes would be filled with the screws during assembly of the exterior aircraft light. Still, no portion of the mounting board 4 or the LED 6 would be non-covered in the assembled state.

The mounting board 4 also comprises a slit 14, reaching through the mounting board 4 on one side of the LED 6. This slit 14 is configured to receive a near end of life detector. This near end of life detector may also be coupled to the control unit described above. The near end of life detector may capture some of the light emitted by the LED 6 and may deduce a state of degradation of the LED 6. It is therefore able to detect and indicate a near end of life condition. It is also possible that the near end of life detector is also arranged on the mounting board 4 and also enclosed by the mounting board enclosure and lens structure 8.

The mounting board enclosure and lens structure 8 of the exemplary embodiment of FIG. 2 is from a soft silicone material. The soft silicone material is overmolded over the mounting board 4, the LED 6, and the additional circuit components 10. In other words, the mounting board enclosure and lens structure 8 is produced via a molding operation onto the mounting board 4, the LED 6, and the additional circuit components 10.

Figure 3A:
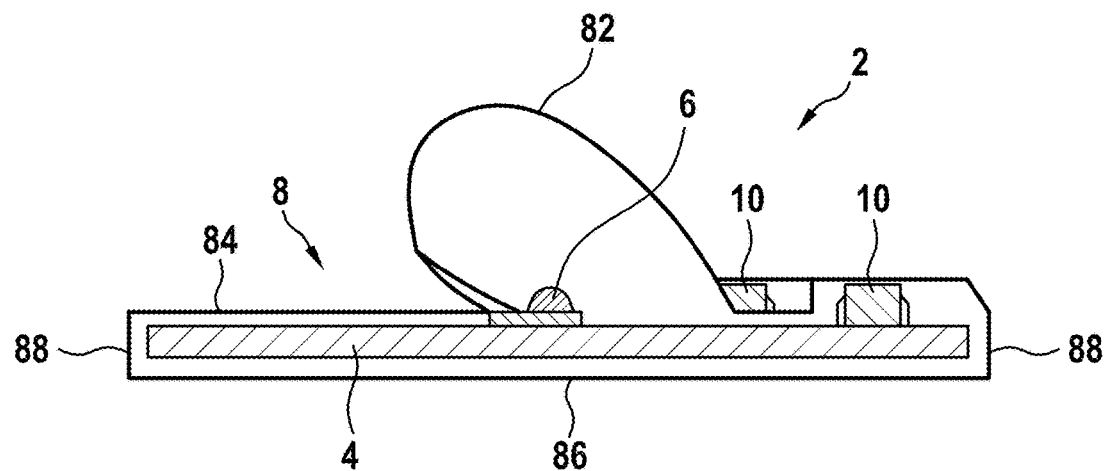
FIG. 3a-3b shows cross-sectional views through the exterior aircraft light of FIG. 2.
Figure 3B:
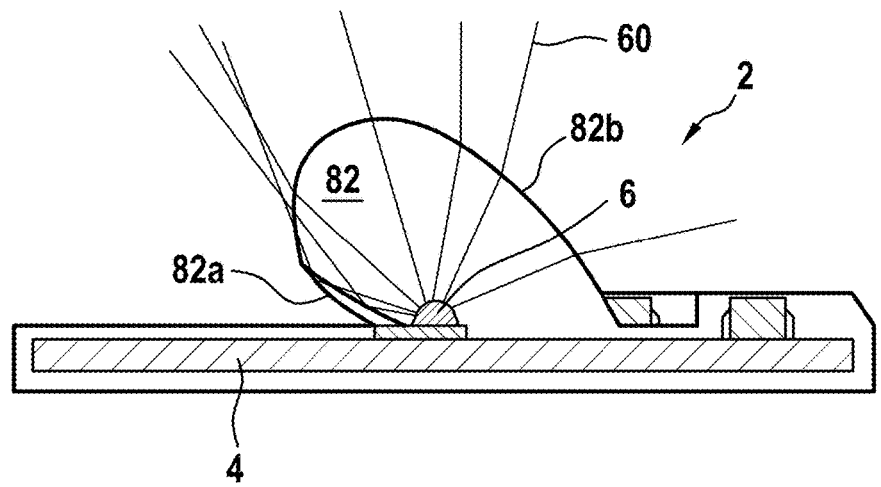

FIG. 3 shows a cross-sectional view through the exterior aircraft light 2 of FIG. 2. The cross-sectional plane of FIG. 3 is a plane perpendicular to the plane of extension of the plate-like mounting board 4. In particular, the viewing direction of FIG. 3 is indicated by arrows A-A in FIG. 2. FIGS. 3a and 3b both show the same exterior aircraft light 2. For a clearer illustration of the components, FIG. 3a shows the exterior aircraft light 2 without any light rays. For a better illustration of the resulting output light intensity distribution, FIG. 3b shows the exterior aircraft light 2 with some exemplary light rays. For ease of illustration, the through holes 12 and the slit 14 are not shown in FIG. 3.

As already described above with respect to FIG. 2, the mounting board enclosure and lens structure 8 fully encloses the mounting board 4, the LED 6, and the additional circuit components 10, two of which are shown in FIG. 3, one in the cross-sectional plane of FIG. 3 and one behind the cross-sectional plane of FIG. 3. In addition to covering the upper side, the lower side and the side faces of the mounting board 4 as well as the LED 6 and the additional circuit components 10, the mounting board enclosure and lens structure 8 forms a lens 82 that has a substantial height above the mounting board 4. Its extension in the direction perpendicular to the mounting board 4 is about half of the extension of the mounting board 4 in its plane of extension in the cross-sectional view of FIG. 3.

The top portion 84 of the covering layer of the mounting board enclosure and lens structure 8 covers the upper side of the mounting board 4. With the mounting board 4 being a printed circuit board, having electrical connectors arranged thereon, the top portion 84 insulates these electrical connectors as well as the LED and the additional circuit components 10. In this way, the top portion 84 provides for an effective protection of electrostatic discharge. The top portion may have a height of about 1.5 mm, thus providing effective electrostatic discharge protection up to high voltages.

The bottom portion 86 of the covering layer of the mounting board enclosure and lens structure 8 covers the lower side of the mounting board 4. It provides a structure of effective heat transport away from the mounting board 4. In particular, it provides a heat bridge between the mounting board 4 and a support structure, such as a housing, to which the mounting board is fastened. In this way, the heat generated during operation of the exterior aircraft light can be effectively transported from the mounting board 4 to the housing, which acts as a heat sink.

The side portions 88 of the covering layer of the mounting board enclosure and lens structure 8 connect the top portion 84 to the bottom portion 86. In this way, a full enclosure of the mounting board 4 and the LED 6 is achieved. The mounting board enclosure and lens structure 8 does not have any free edge. Hence, no point of the mounting board enclosure and lens structure 8 poses a great danger of starting to peel off of the mounting board 4 inadvertently.

In FIG. 3b, the conditioning of the output light intensity distribution by the lens 82 is illustrated via exemplary light rays 60. The exemplary light rays 60 are light rays, as emitted by the LED 6 during operation of the exterior aircraft light 2. The lens 82 has a first surface 82a, which is a surface of total internal reflection. Further, the lens 82 has a second surface 82b, which is a surface of refraction. All light from the LED 6 leaves the lens 82 via the second surface 82b, i.e. via a refractive process. Some of the light from the LED 6 is internally reflected within the lens 82 at the first surface 82a, before leaving the lens 82 via the second surface 82b. In this way, a strong collimation of light in the angular range of between 100° and 110°, as measured with respect to the upper side of the mounting board 4, is achieved. The output light intensity becomes smaller with smaller angles with respect to the upper side of the mounting board 4. In this way, an exterior aircraft light having the output light intensity distribution of FIG. 1 may be provided. When assembled at a suitable angle in the wing tip of the aircraft, a suitable forward navigation output light intensity distribution is achieved. It is pointed out that there are other ways of reaching a suitable output light intensity distribution via other geometries of the lens 82. Also, other kinds of exterior aircraft lights may have other kinds of lens geometries for being suitable for the application in question.

Figure 4:
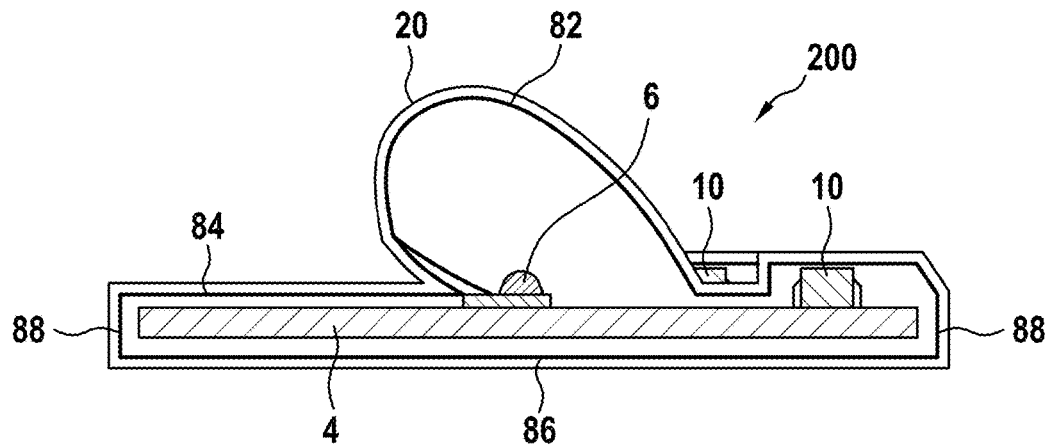
FIG. 4 shows a cross-sectional view through an exterior aircraft light in accordance with another exemplary embodiment of the invention.

FIG. 4 shows a cross-sectional view through an exterior aircraft light 200 in accordance with another exemplary embodiment of the invention. The exterior aircraft light 200 of FIG. 4 is similar to the exterior aircraft light 2 of FIG. 3, and the viewing direction and cross-sectional plane of FIG. 4 are identical to FIG. 3. Like elements are referred to with like reference numerals, and a description thereof is omitted for brevity.

In particular, the exterior aircraft light 200 of FIG. 4 is identical to the exterior aircraft light 2 of FIG. 3, with the exception that a parylene coating 20 is provided. The parylene coating is coated onto the entire mounting board enclosure and lens structure 8, i.e. it covers the entire outer surface of the mounting board enclosure and lens structure 8. The parylene coating 20 serves two purposes. First, the parylene coating is gas impermeable and protects the mounting board enclosure and lens structure 8 in the highly adverse operating conditions of exterior aircraft lights, in particular from corrosive gases. In particular, when an exterior aircraft light is placed close to a turbine exhaust, the parylene coating is an effective means of blocking the aggressive exhaust gases from the mounting board enclosure and lens structure 8. Second, after deposition, the parylene coating 20 forms a fairly rigid structure, thus forming a corset or case around the mounting board enclosure and lens structure 8. In particular, the mounting board 4 and the parylene coating 20 jointly provide enhanced stability to the mounting board enclosure and lens structure 8.

Figure 5:
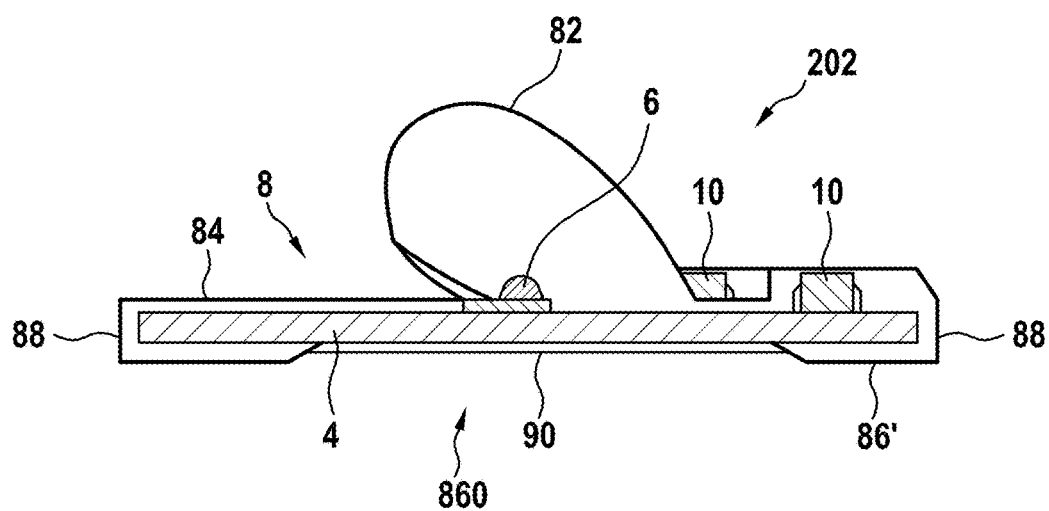
FIG. 5 shows a cross-sectional view through an exterior aircraft light in accordance with yet another exemplary embodiment of the invention.

FIG. 5 shows a cross-sectional view through an exterior aircraft light 202 in accordance with yet another exemplary embodiment of the invention. The exterior aircraft light 202 of FIG. 5 is similar to the exterior aircraft light 2 of FIG. 3, and the viewing direction and cross-sectional plane of FIG. 5 are identical to FIG. 3. Like elements are referred to with like reference numerals, and a description thereof is omitted for brevity.

In particular, the exterior aircraft light 202 of FIG. 5 is identical to the exterior aircraft light 2 of FIG. 3, with the exception that the mounting board enclosure and lens structure 8 is a composite structure of two materials that jointly enclose the mounting board 4 and the LED 6. In particular, the mounting board enclosure and lens structure 8 of FIG. 5 has two different materials that jointly cover the lower side of the mounting board 4. The lens 82, the top portion 84 of the covering layer, the side portions 88 of the covering layer, and an outer portion 86' of a bottom portion 860 of the covering layer are made from a one-piece soft silicone structure, as described above. An inner portion 90 of the bottom portion 860 of the covering layer is made from a filler material. The filler material 90 fills the silicone gap in the mounting board enclosure and lens structure 8, such that the mounting board enclosure and lens structure 8 as a whole fully encloses the mounting board 4, the LED 6 and the additional circuit components 10. A part of the silicone structure and the filler material 90 jointly form the bottom portion 860 of the covering layer of the mounting board enclosure and lens structure 8. In this way, there is also no edge of the silicone structure, such that the risk of the silicone structure peeling off inadvertently is kept low.

The filler material 90 is parylene in the exemplary embodiment of FIG. 5. The thickness of the filler material 90 is less than the thickness of the outer portion 86' of the silicone structure arranged on the lower side of the mounting board 4. However, it is also possible that the thicknesses are substantially the same, such that the mounting board 4 can be placed onto a housing of the exterior aircraft light 202 or the like with an even surface.

It is also possible that the embodiments of FIGS. 4 and 5 are combined, i.e. that the silicone structure has the shape shown in FIG. 5 and that a parylene coating fully encloses the silicone structure and the mounting board 4, thus filling the gap in the silicone structure at the lower side of the mounting board 4 and coating the entire silicone structure.

It is further pointed out that the partitioning of the covering layer between the silicone structure and the filler material, i.e. the splitting up of mounting board area between the silicone structure and the filler material, may be different. It is for example possible that only the portion of the mounting board enclosure and lens structure 8 on top of the upper side of the mounting board 4 is from silicone. The filler material then has an adapted extension that still ensures a full enclosure of the mounting board 4 by the combination of the silicone structure and the filler material.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:
1. An exterior aircraft light, comprising:
   a mounting board, having an upper side, a lower side and a plurality of side faces,
   at least one LED, arranged on the upper side of the mounting board,
   a mounting board enclosure and lens structure, wherein the mounting board enclosure and lens structure comprises a lens arranged over the at least one LED for shaping an output light intensity distribution of the exterior aircraft light and a covering layer arranged on the upper side, the lower side and the plurality of side faces of the mounting board,
wherein the mounting board enclosure and lens structure is an integral silicone structure, and
a gas impermeable coating, coated over the mounting board enclosure and lens structure,
wherein the exterior aircraft light is one of: a navigation light, an anti-collision light, a landing light, a runway turnoff light, a taxi light, and a logo light.

2. The exterior aircraft light according to claim 1, wherein the mounting board enclosure and lens structure fully encloses the mounting board and the at least one LED.

3. The exterior aircraft light according to claim 1, wherein the mounting board enclosure and lens structure is overmolded over the mounting board and the at least one LED.

4. The exterior aircraft light according to claim 1, wherein the mounting board enclosure and lens structure is made from a soft silicone.

5. The exterior aircraft light according to claim 1, wherein the gas impermeable coating is a parylene coating.

6. The exterior aircraft light according to claim 1, wherein the covering layer has a top portion, arranged on the upper side of the mounting board, wherein the top portion has a thickness of between 0.25 mm and 2.5mm.

7. The exterior aircraft light according to claim 1, wherein the covering layer has a bottom portion, arranged on the lower side of the mounting board, wherein the bottom portion has a thickness of between 0.5 mm and 4 mm.

8. An aircraft, comprising at least one exterior aircraft light according to claim 1, arranged on an outside of the aircraft.

9. The exterior aircraft light according to claim 1, wherein the covering layer has a top portion, arranged on the upper side of the mounting board, wherein the top portion has a thickness of between 1 mm and 2 mm.

10. The exterior aircraft light according to claim 1, wherein the covering layer has a bottom portion, arranged on the lower side of the mounting board, wherein the bottom portion has a thickness of between 1 mm and 3 mm.

11. An exterior aircraft light, comprising:
a mounting board, having an upper side, a lower side and a plurality of side faces,
at least one LED, arranged on the upper side of the mounting board, and
a mounting board enclosure and lens structure, wherein the mounting board enclosure and lens structure comprises a lens arranged over the at least one LED for shaping an output light intensity distribution of the exterior aircraft light and a covering layer, arranged on the upper side, the lower side and the plurality of side faces of the mounting board,
wherein the lens and a first portion of the covering layer are from silicone and wherein a second portion of the covering layer is from a filler material, and
a gas impermeable coating, coated over the lens and the first portion of the covering layer,
wherein the exterior aircraft light is one of: a navigation light, an anti-collision light, a landing light, a runway turnoff light, a taxi light, and a logo light.

12. The exterior aircraft light according to claim 11, wherein the first portion of the covering layer is arranged on the upper side, the plurality of side faces, and part of the lower side of the mounting board.

13. The exterior aircraft light according to claim 11 wherein the mounting board enclosure and lens structure fully encloses the mounting board and the at least one LED.

14. The exterior aircraft light according to claim 11 wherein the filler material is parylene.

15. The exterior aircraft light according to claim 11, wherein the gas impermeable coating is a parylene coating.

* * * * *